J. M. DAVIS.
NUT LOCK.
APPLICATION FILED DEC. 8, 1914.
1,143,254.
Patented June 15, 1915.
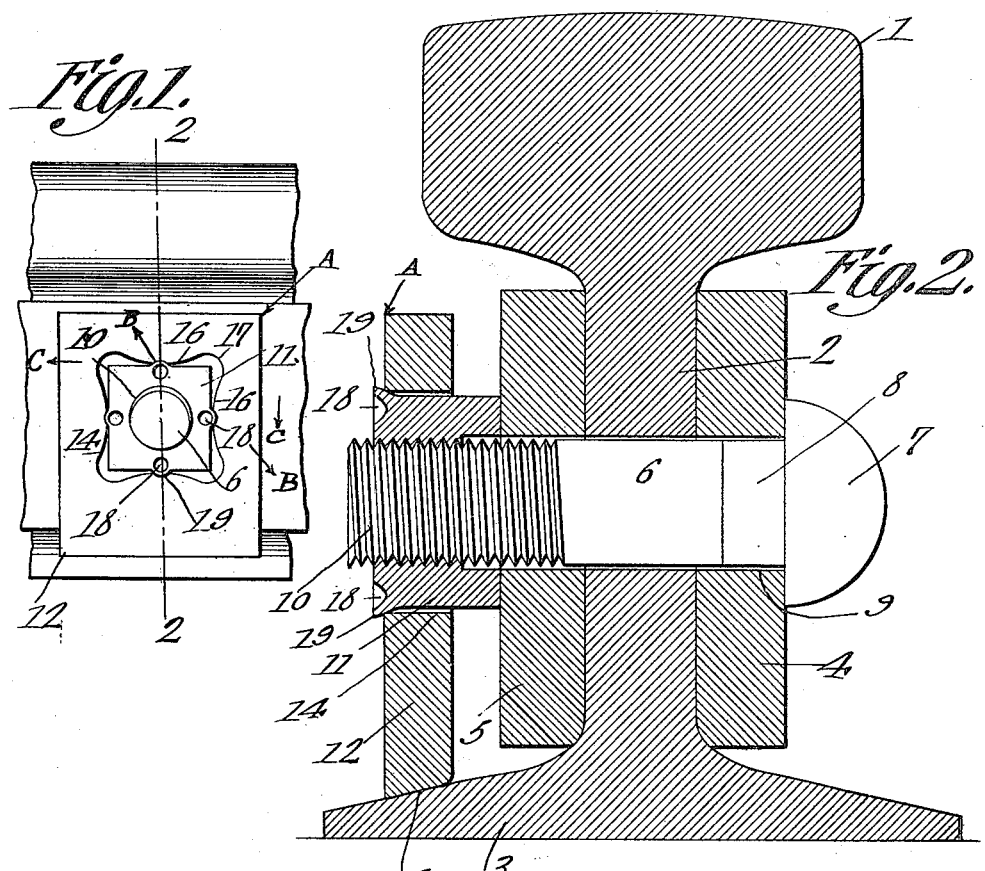
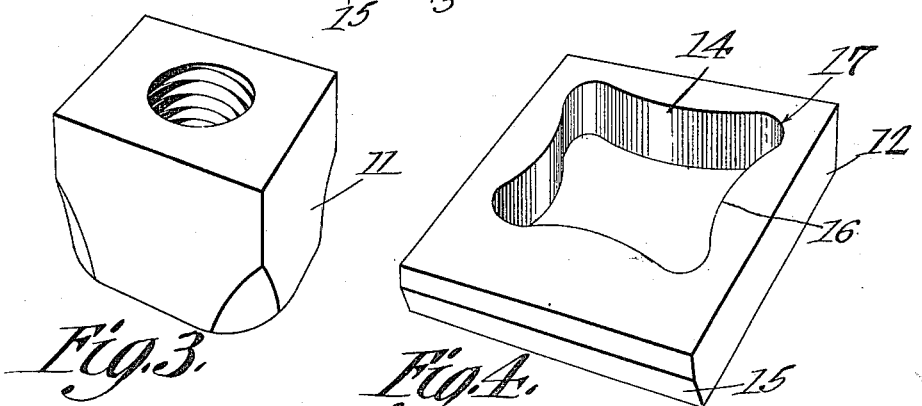
Witnesses
J. M. Davis, Inventor
Attorneys

UNITED STATES PATENT OFFICE.

JAMES MAT DAVIS, OF WYTHEVILLE, VIRGINIA.

NUT-LOCK.

1,143,254.

Specification of Letters Patent.   Patented June 15, 1915.

Application filed December 8, 1914.   Serial No. 876,114.

*To all whom it may concern:*

Be it known that I, JAMES MAT DAVIS, a citizen of the United States, residing at Wytheville, in the county of Wythe and State of Virginia, have invented a new and useful Nut-Lock, of which the following is a specification.

The device forming the subject matter of this application is a nut lock, and the invention aims, primarily, to provide a novel means for engaging the rotatable element of the nut and bolt structure with the locking member in which the rotatable element is received.

Another object of the invention is to provide a locking member having a novel form of opening, whereby the locking member may be manipulated to permit the rotatable element of the nut and bolt structure to be freed.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows the invention in side elevation; Fig. 2 is a cross section on the line 2—2 of Fig. 1; Fig. 3 is a perspective showing the nut; Fig. 4 is a perspective showing the locking member.

The device herein disclosed is adapted to be employed in a wide variety of ways, but by way of illustration, it has been presupposed that the structure is used upon a railroad rail, the ball of which is denoted by the numeral 1, the numeral 2 indicating the web of a rail, and the numeral 3 indicating the flange. To one side of the web 2 is applied a fish plate 4 and to the other side of the web is applied a fish plate 5. Through the fish plates 4 and 5 and through the web 2 extends a bolt 6 the head of which is denoted by the numeral 7, the bolt being enlarged slightly at 8, adjacent the head 7 to engage properly with the opening 9 in the fish plate 4, thereby to prevent the bolt 6 from rotating. The structure involved at 8 is common and well known in the art and need not be described in greater detail.

Applied to the threaded portion 10 of the bolt 6 is a nut 11. In connection with the nut 11 there is employed a locking member in the form of a plate 12. The plate 12 is provided with an opening 14 which receives the nut 11, one edge 15 of the locking plate 12 being beveled so as to coöperate properly with the upper edge of the flange 3, as clearly shown in Fig. 2. The opening 14 in the locking plate 12 is of sinuous form, thereby to define shoulders 16 which lie adjacent the edges of the nut 11, and to define openings 17 which lie adjacent the corners of the nut 11.

By means of a punch or the like, recesses 18 are formed in the outer end face of the nut 11, these recesses serving to define bosses 19 which engage with the shoulders 16 and serve to hold the locking plate 12 in place.

Referring to Fig. 2 it will be obvious that when the nut 11 is mounted in the plate 12, the nut and the plate cannot turn because the latter is engaged with the flange 3 of the rail. The plate 12 cannot become disengaged from the nut 11, owing to the presence of the bosses 19. When, however, it is desired to loosen the nut 11, from the bolt 6, the plate 12 is struck sharply at its upper corner in the direction of the arrow A. Owing to the sinuous form of the opening 14 and owing to the presence of the openings 17 adjacent the corners of the nut, the plate 12 will spring in the direction of the arrows B sufficiently to permit a removal of the plate from the nut 11. A detaching or loosening of the plate 12 may take place by springing the plate off the nut 11 as above stated, without materially changing the contour of the bosses 19, or, under some circumstances, the shoulders 16 will move in the direction of the arrows C and flatten down the bosses 19.

Having thus described the invention, what is claimed is:—

1. In a nut lock, a bolt and nut structure comprising a rotatable element; and a locking member having an opening in which the rotatable element is received, the outer end face of the rotatable element being distorted to form in the edge of the rotatable element a boss which is engaged with the locking member.

2. In a nut lock, a bolt and nut structure comprising a rotatable element; and a locking member having an opening in which the rotatable element is received, the outer end face of the rotatable element being provided close to its edge with a recess defining in the edge of the rotatable element a boss which is engaged with the locking member.

3. In a nut lock, a bolt and nut structure comprising a rotatable element; and a locking member having an opening in which the rotatable element is received, the opening being of sinuous peripheral outline to define shoulders adjacent the edges of the rotatable element and to define openings adjacent the corners of the rotatable element; the rotatable element being provided in its edge with bosses which are engaged with the shoulders.

In testimony that I claim the foregoing as my own, I have hereto affixed my signature in the presence of two witnesses.

JAMES MAT DAVIS.

Witnesses:
J. FRED EWALD,
W. S. POOGE.